May 2, 1939. R. HINTZE 2,156,628
COMPRESSION REFRIGERATING APPARATUS
Filed April 30, 1937   3 Sheets-Sheet 2
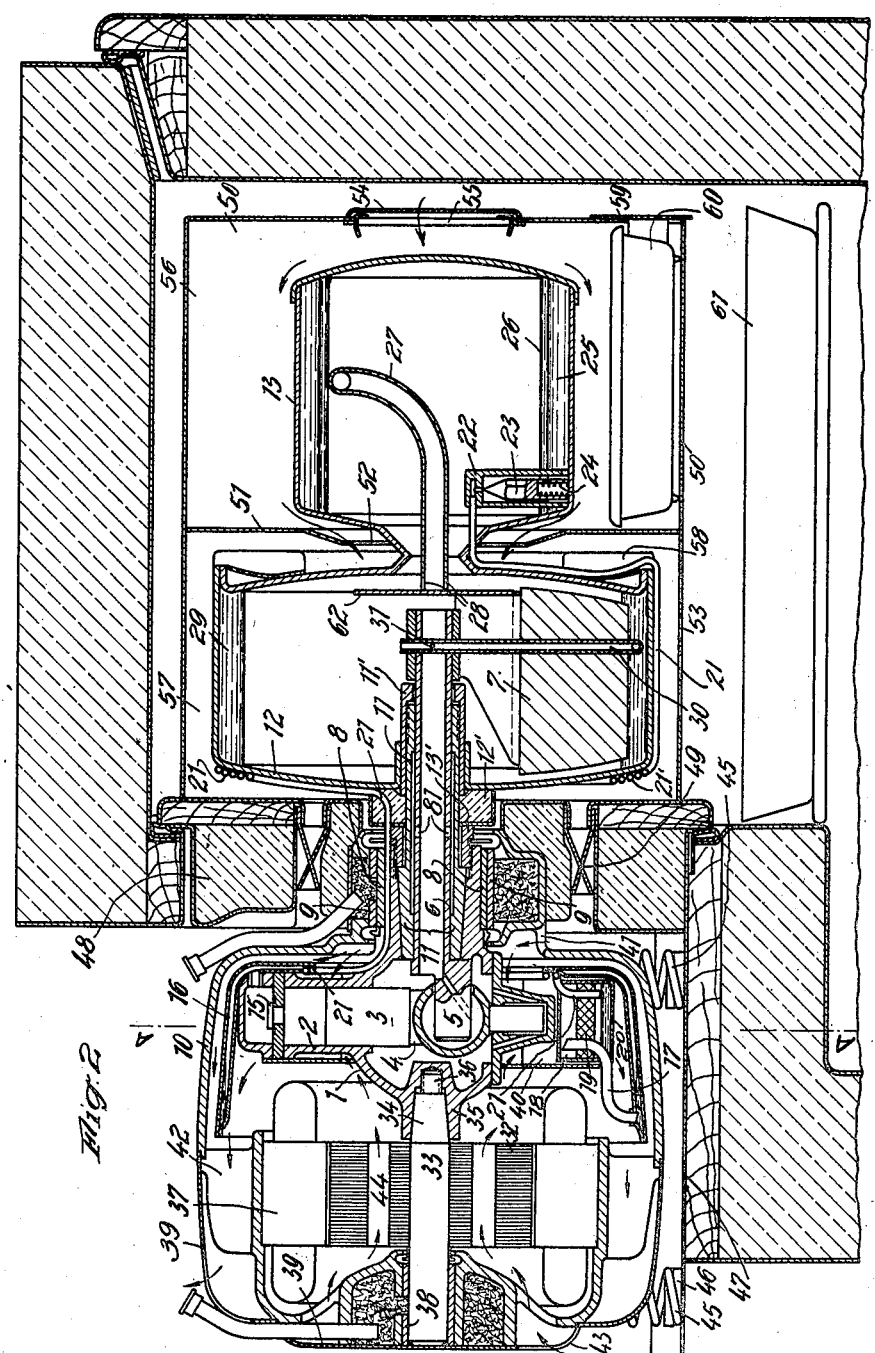

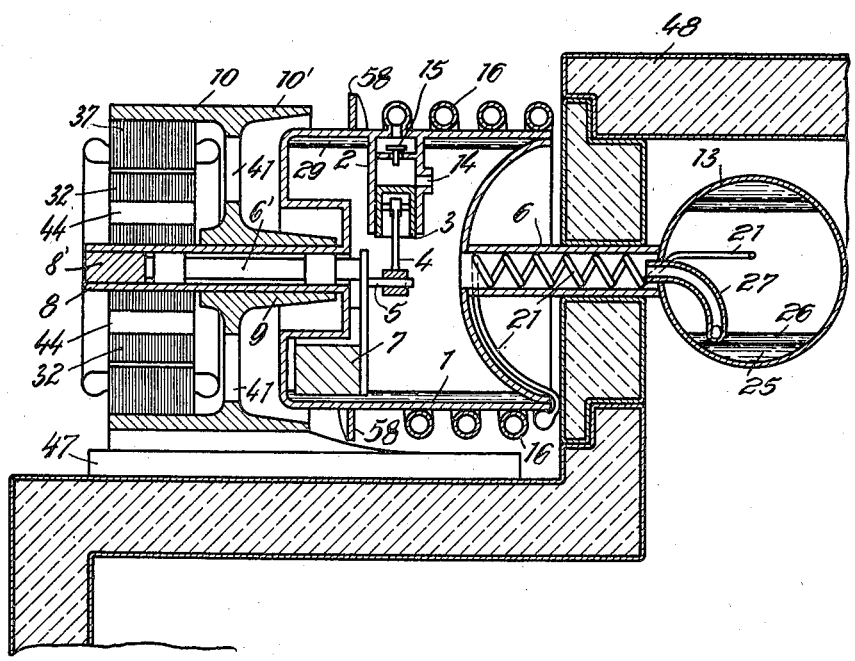

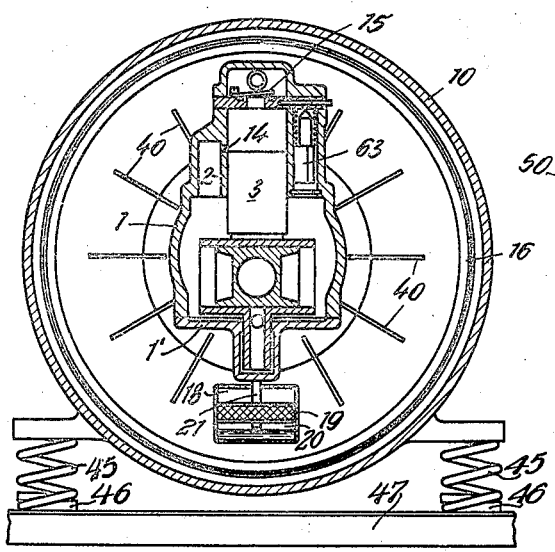
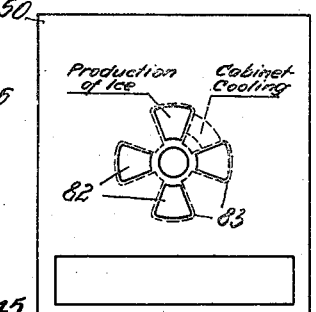
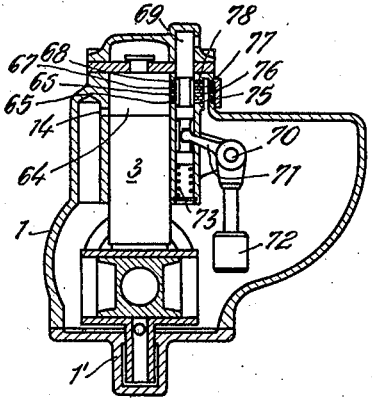
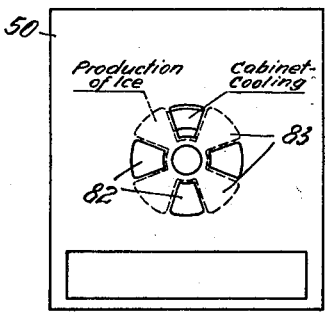

Patented May 2, 1939

2,156,628

UNITED STATES PATENT OFFICE 2,156,628

COMPRESSION REFRIGERATING APPARATUS

Rudolf Hintze, Berlin-Charlottenburg, Germany, assignor to Siemens-Schuckertwerke Aktiengesellschaft, Berlin-Siemensstadt, Germany, a corporation of Germany Application April 30, 1937, Serial No. 139,889
In Germany April 30, 1936

23 Claims. (Cl. 62—115)

My invention relates to compression refrigerating apparatus, and more particularly to apparatus provided with a rotary condenser and a rotary evaporator.

Apparatus in which a counter-weight is so mounted inside a rotary casing that it retains its position when the casing revolves are well known in the art. Between this counter-weight and the rotary casing is arranged the compressor of the apparatus. The casing forms, as a rule, the condenser and is connected to another coaxially arranged casing which forms the evaporator of the set. These known sets are, in general, driven with the aid of an electric motor by the use of a driving belt.

Refrigerating apparatus of the above character have been for some time past superseded by other systems provided with a stationary compressor, condenser and an evaporator, since the rotary sets presented numerous difficulties so that they were not suitable particularly for use in connection with domestic refrigerators.

An object of my invention consists in improving refrigerating apparatus provided with a rotary condenser and a rotary evaporator in such a manner as to eliminate the difficulties hitherto experienced and to build apparatus of small dimensions suitable for domestic refrigerators.

Another object of my invention is to provide a refrigerating apparatus with artificial air cooling (cooling by a ventilator) having a particularly compact construction and in which all parts, such as an electric driving motor, the condenser and the evaporator are integrated into a unit.

Another object of my invention consists in avoiding the difficulties hitherto encountered in providing an air-tight joint between the low-pressure part and the high-pressure part of refrigerating apparatus having a rotary condenser and a rotary evaporator.

A further object of my invention is to obtain by simple means an effective common cooling of the compressor and motor of rotary refrigerating sets.

An object of my invention is also to construct a hermetically sealed compression unit in such a way that it may be provided, as desired, with a direct current or an alternating current motor.

A further object of my invention is to improve the circulation of the air inside of a refrigerator without the use of a separate electric drive for this circulation.

Other objects of my invention consist in the following: In rotary refrigerating apparatus with counter-weight, the prevention of a rotation of the weight or an overload of the motor is aimed at in order to increase the reliability of operation. The noises of the compressor shall be damped. Furthermore, the refrigerating apparatus shall be so designed that it may be adapted to changing requirements, particularly a control is aimed at which allows adjusting the apparatus either for a rapid production of ice at a temperature as low as possible, or for a preservation of foods at high temperatures.

Still another object of my invention consists in assembling apparatus equipped with a rotary condenser and a rotary evaporator together with the electric motor for driving the same to a unit which may be easily placed in and removed from the refrigerator cabinet.

According to the invention, in a refrigerating apparatus of the above-mentioned type, the electric motor, the rotary casing of the condenser and of the counter-weight, as well as the rotary casing of the evaporator, are coaxially mounted on a common base plate the revolving part of the electric motor being directly connected to the shaft of the other revolving parts of the set.

Further, according to the invention, at least one of the revolving parts is designed as a blower for cooling the motor and compressor. The blower produces a current of air which dissipates the total wast heat produced during the operation of the apparatus to the outside atmosphere. In this case, it is preferable to design the revolving part of the set in the form of a centrifugal blower.

A particularly advantageous and compact construction of the refrigerating apparatus is obtained if, according to the invention, the rotary compressor casing, designed in the form of a rotor of a centrifugal blower, is directly coupled with the armature of the driving motor, and the stator of the motor is connected with an outer casing which closes the rotary compressor casing and the rotary condenser against the outside atmosphere. In this manner, a construction is obtained in which it is easily possible to damp the noise of the compressor to a great extent. To this end, the inlet and outlet openings for the cooling air in the casing which encloses the set, consisting of the driving motor, compressor and condenser, are arranged at the lower end or at the side of the casing so that the sound waves coming from the inside of the casing are caused to follow a tortuous path and are thus damped.

In the known rotary refrigerators with an enclosed pendulous weight, the casing enclosing the compressor was under the pressure of the condenser and had to be sealed against the casing of the evaporator in which low pressure prevails, by a stuffing box or a similar leakage preventing device. According to the invention the casing enclosing the compressor of a rotary refrigerating apparatus of the type here pertinent, is in open communication with the evaporator, i. e. with the low pressure prevailing therein. In this manner, stuffing boxes and similar leakage preventing devices are dispensed with between the different sections of the revolving machine portion.

In the known apparatus having a rotary condenser and a rotary evaporator, the counterweight is arranged in the casing enclosing the compressor. Consequently, this casing has comparatively large dimensions.

According to the invention considerably smaller dimensions of the set may be obtained by enclosing the weight in a separate rotary casing arranged in the cooling chamber and in open communication on one side with the evaporator and on the other side with the suction side of the compressor. The casing enclosing the counterweight is preferably employed also as an oil container, a liquid and oil separator and as a superheater for the operating medium coming from the evaporator. The arrangement of the counterweight in a casing in which pressure of evaporation prevails, presents the further advantage that the bearing for the entire refrigerating apparatus set may be easily arranged in the wall of a refrigerator cabinet and that the heat insulation and the sealing of this wall may be effected in a very simple manner.

Also for the supply of refrigeration from the evaporator to the cooling chamber and for the control of the temperature in the evaporator, a separate, perforated casing enclosing the counterweight is of particular advantage if, according to the invention, this casing is designed as a rotor of a centrifugal blower which serves to circulate the cooling chamber air. If, further, the revolving parts of the refrigerating apparatus mounted in the cooling chamber are surrounded by a protective hood firmly secured within the cooling chamber, a particularly simple control of the supply of refrigeration may be attained by providing means for controlling the circulation of air between the cooling chamber proper and the interior of the hood enclosing the evaporator. If an evaporator is employed which is flooded by the liquid refrigerant, the temperature in the evaporator may be easily controlled by diminishing the supply of air to the heat-absorbing surfaces of the evaporator. In domestic refrigerators besides the cooling of the cooling chamber also the production of ice is essential. For cooling the cooling chamber proper, a high temperature of evaporation of about 0 degree centigrade is economical, whereas for the production of ice considerably lower temperatures, such as —10 to —20 degrees centigrade are required depending upon the rapidity with which ice is to be produced. In practice, these requirements have been hitherto in most cases fulfilled by choosing for the temperature of evaporation a mean value lying between the above-mentioned limit values, by means of which it is neither possible to attain the optimum of an economical cooling of the cooling chamber nor a rapid production of ice. In contradistinction to this known method, it is possible by the invention to adapt the temperature of evaporation to the operating conditions of the refrigerator in a manner depending upon whether a normal cooling of the refrigerator or a speeded production of ice is to be effected.

During normal operation, i. e., when the evaporator is to supply its refrigeration above all to the cooling chamber, the compression refrigerating apparatus is preferably so operated that the temperature of evaporation amounts to about 0 degree centigrade; consequently, the efficiency of the refrigerator for the production of cold is very high.

If a speedy ice production is desired, the air openings of the hood enclosing the evaporator are closed after inserting the ice trays into the hood. Since the openings normally supply the cooling chamber air to the evaporator, the closure of these openings decreases considerably the volume of air to be cooled, and the temperature of evaporation falls to such a low value as to ensure a rapid production of ice.

According to the invention, further, the counterweight and the motor are so dimensioned with respect to each other that the maximum countermoment exerted by the weight is greater than the maximum torque of the driving motor. The counterweight, therefore, effects a braking of the driving motor at excess loads. Thereby a rotation of the counterweight is prevented and a decrease in speed is brought about by the overload, which, preferably, is taken advantage of to relieve the compressor and, therefore, the motor by means of automatic control devices preferably actuated by the centrifugal force. At the same time such a speed-responsive control device may be employed in facilitating the starting by the fact that the compressor is correspondingly relieved at standstill or at low speeds.

The difficulties encountered in starting may be removed according to the invention by causing a control device operating in response to the motor output, for instance to the motor current, to adjust the compressor output in accordance with the motor load For instance, upon exceeding a given motor output, the pressure side of the compressor may be connected to the suction side thereof. A particularly accurate adaptation to the varying operating conditions is obtained if the effective compressor chamber is automatically adjusted in accordance with the load of the motor. To this end, a valve actuated by the centrifugal force is preferably employed which enlarges or reduces the compressor chamber in accordance with the speed, i. e., with the load of the motor.

Further details of my invention will be apparent from the following description taken in connection with the accompanying drawings in which—

Fig. 1 shows a longitudinal sectional view of a unit according to the invention, for refrigerator cabinets;

Fig 2 shows a longitudinal sectional view of a detailed construction of a second embodiment.

Fig. 3 shows a transverse sectional view taken on the line A—A of Fig. 2 and, especially, illustrates a valve for protecting the driving motor against overload;

Fig. 4 shows a transverse sectional view of a modified form of the valve shown in Fig. 3;

Fig. 5 shows a top view of a casing which encloses the evaporator and is provided with a device for regulating the circulation of air in the refrigerator, and Fig 6 shows another top view of the casing shown in Fig. 5, the regulating device being differently adjusted.

Referring to Fig. 1, 1 denotes the compressor casing, 2 the cylinder of the compressor and 3 the piston reciprocating therein. The piston is connected to the crank 5 through a connecting rod 4, the crank being mounted to the crank shaft 6'. A counterweight 7 is also secured to the crank shaft. To the condenser casing 1 is firmly secured a hollow journal 8, rotatably mounted in the bearing 9 which forms a part of the motor casing 10. The crank shaft 6' is rotatably mounted in the hollow journal 8, which is closed against the outside by a body 8'.

The motor casing 10 rests on a base plate 47 which supports the entire unit. The armature 32 of the motor is mounted on the journal 8 and is provided with channels 44 for the passage of the cooling air. 37 denotes the magnet body of the motor stator. The motor casing 10 has an extension 10' which serves to guide the current of air supplied by the rotary compressor casing. Besides the above-mentioned channels 44 for the passage of air, the motor casing 10 is also provided with apertures 41. 58 denotes ventilator blades arranged on the casing 1.

The condenser casing 1 is connected with the evaporator 13 by a conduit 6 and a bend 27. 48 denotes the wall of the refrigerator cabinet. The evaporator 13 is in open communication with the casing 1 and with the inside of the compressor cylinder 2 through one or more apertures 14. Since the casing of the compressor is under the pressure of evaporation (low pressure) seals and stuffing boxes are dispensed with between the compressor casing and the evaporator.

15 denotes a check valve. The condenser consists of a tube 16 spirally wound on the periphery of the casing 1. The tube windings form also, besides the blades 58, a means for transporting the cooling air. The condenser 16 is connected to the evaporator by a throttling capillary tube 21.

During the rotation, the liquid refrigerant in the evaporator 13 coming from the condenser is centrifugated and assumes the position as indicated at 25, whereas the lubricant (oil) which is specifically lighter remains on the surface of the liquid refrigerant as indicated at 26. The bend 27 dips into the lubricant 26 and conveys it back to the casing 1 through the conduit 6 and assumes when the casing is revolving the position indicated at 29, whence the lubricant is conveyed to the points of the compressor and of the parts 6 and 8 to be lubricated by means hereinafter described in connection with Fig. 2.

The vaporous refrigerant, for instance, sulfur dioxide is compressed in the casing 1 by the compressor and passes into the condenser 16 which, when being rotated, is considerably cooled. The refrigerant liquefied in the condenser passes into the evaporator 13 through the capillary tube 21. After evaporation, the refrigerant returns into the casing 1 through the tubes 27 and 6 and is again compressed.

As is apparent from Fig. 1, the refrigerant and the lubricant circulate in an hermetically sealed circulating system which entirely avoids stuffing boxes and the like auxiliaries. Despite this fact, the motor is easily accessible. Therefore it is possible to equip the same sealed device either with an alternating-current motor or a direct-current motor, an advance which is not possible in the hermetically-sealed refrigerator units hitherto employed. The electric motor may be easily replaced without the need of opening the sealed portion of the refrigerating unit. Furthermore, the windings and other electrical parts of the motor are completely protected from the action of the refrigerant.

Such devices may be improved according to the invention in various respects as will be seen from the description of the embodiment shown in Figs. 2 and 3, in which similar numerals of reference indicate similar parts as in Fig. 1.

Figs. 2 and 3 show a compression refrigerating apparatus, operating for instance with sulfur dioxide, which is mounted in a domestic refrigerator. The compressor cylinder 2 containing the piston 3 forms an integral part of the compressor casing 1. The reciprocation of the piston 3 within cylinder 2 is caused by the fact that while the compressor casing 1 rotates, the crank shaft 6 with the crank 5 engaging the piston is held stationary by means of a counterweight 7. A journal 8 which rests in a bearing 9 is firmly secured to the compressor casing 1. The bearing 9 is connected with an outer enclosure 10. A casing 12 enclosing the counterweight 7 is firmly secured, by means of an intermediate part 11', 12' and 13', to a sleeve 11 fixed to the compressor casing 1. The evaporator casing 13, the casing 12, the compressor casing 1 including its cover part 1' (Fig. 3), the journal 8, and the elements 11, 13', 12' and 11' as well as the condenser 16, which are firmly connected with one another, form together the outer body of a sealed rotary unit journalled in the stationary bearing 9.

The evaporator 13 is in open communication with the casing 12 and also with the inner space of the compressor 1 through the hollow shaft 6. The compressor crank case is, therefore, under the pressure of evaporation, so that a power consuming seal in the form of a stuffing box is avoided between the crank case and the evaporator.

The vaporous refrigerant drawn out of the evaporator passes into the compressor chamber through openings 14 and is forced by the action of the piston 3 into the condenser 16 through a check valve 15. The liquefied refrigerant passes from condenser 16 through a conduit 17 into a chamber 18 and thence through a filter 19 into a chamber 20. The filter 19 is designed in the form of a counterweight for balancing the weight of the cylinder. A capillary tube 21 connects the chamber 20 with the evaporator 13. Some windings of the throttle tube 21 are exposed to the flow of the cooling air as will be seen from Fig. 1. The tube traverses the journal 8. Some windings 21' of tube 21 are wound around the casing 12. The tube 21 ends in a valve 22 arranged in the evaporator 13. This valve has the purpose of preventing the flow of the liquid refrigerant to the evaporator during the rest periods of the unit. The valve is provided with a weight 23 and a spring 24, and is brought into the opening position shown by the centrifugal force against the closing tendency of the spring. When the rotation speed of the unit drops below a certain value, the force exerted by the spring 24 predominates and closes the valve.

The liquid refrigerant and the lubricant mixed therewith collect in the evaporator 13, the specifically heavier refrigerant forming as a result of the centrifugal force the lower layer 25 and the specifically lighter lubricant the upper layer 26. The evaporator casing takes up heat from the cooling chamber so that the refrigerant evaporates and passes from the evaporation chamber through the casing 12 and the hollow shaft 6 back to the suction side of the compressor.

The oil is taken from the oil layer 26 of the evaporator by a conduit 27 and passes through the openings 28 into the casing 12 and collects at the periphery thereof in the form of a cylindrical layer 29. To lubricate the compressor, the oil is forced through a conduit 30 in the upward direction. The lubricant passes through an opening 31 into the hollow shaft 6 and is conveyed to the compressor by the vaporous refrigerant, the bearing of the stationary crank shaft 6 in the revolving sleeve 11 being also lubricated through perforations 81. The conduit 27 is carried by a support 62 firmly secured to the counterweight 7, the support being designed in the form of a baffle plate 62 which effects the separation of the vaporous refrigerant from the liquid entrained from the evaporator. The liquid refrigerant drops into the space enclosed by the casing 12 and is here evaporated so that a properly dried flow of vaporous refrigerant is conveyed to the compressor through the hollow shaft 6.

The compressor casing is directly coupled with the rotor 33 of the driving motor. The shaft 33 of the motor is provided with a tapered end 34 fitting in a corresponding hub 35 of the compressor casing 1. The shaft 33 is screwed in the compressor casing as indicated at 36. The stator 37 of the driving motor is secured to the casing 10 which closes the condenser against the outside. The motor shaft is supported at 38. The motor is closed by a cover 39. The rotary compressor casing is designed in the form of a centrifugal blower. To this end, it is provided with radially arranged blades 40. The condenser 16 which encloses the compressor casing is designed in the form of a guide member of the centrifugal blower. The cooling air is drawn in by an opening 41 arranged at the lower end of the casing 10 and passes in the direction indicated by the arrow between the blower blades 40, flows along the walls of the condenser and comes into contact with cooling ribs 42 of the stator 37. Another current of the cooling air passes through openings 43 arranged in the cover 39 of the electric motor and flows through cooling channels 44 provided in the rotor 32 so as to unite with the current of air coming from the opening 41.

The entire set is mounted on four springs arranged on a base plate 47 and engaging threaded parts 46. The base plate 47 is secured to a cover 48 consisting of heat insulating material. The cover has an annular opening closed by resilient members 49, so as to prevent a flow of the cooling chamber air to the outside atmosphere while allowing the refrigerating set to oscillate relatively to cover 48.

The revolving part of the refrigerating apparatus projecting into the cooling chamber, i. e., the casing 12 and the evaporator 13, are enclosed in a hood 50. The hood is provided with a partition 51 having an opening 52 for the passage of the cooling chamber air.

At the side facing the refrigerator door the hood 50 has an opening 55 provided with a detachable cover 54. When the cover 54 is removed, the cooling chamber air passes through opening 55 in the direction indicated by the arrows into the heat exchange chamber 56 of the evaporator. The air then passes through the opening 52 into the chamber 57 and flows back into the cooling chamber through openings 53. The circulation of the cooling chamber air as above described is caused by the fact that the rotating casing 12 acts as a centrifugal blower. This action is supported by the arrangement of radial ribs 58 at one side of the casing 12. At the lower end of the heat exchange chamber 56 an opening is provided for the introduction of an ice tray 60. 61 denotes a water collecting tank beneath the hood 50 placed on the upper shelf of the refrigerator cabinet.

To prevent an overload of the driving motor, a valve 63 actuated by the centrifugal force is provided in the pressure chamber of the compressor, the valve connecting the pressure chamber of the compressor directly to the suction side upon a decrease of the speed below a certain value. The valve as will be apparent from Fig. 3 operates in this case in such a manner that upon a decrease of the speed below a certain value the compressor is completely relieved. In many cases, it is preferable to design the valve in such a manner as to adapt the motor power automatically to the load. Fig. 4 shows a form of such a valve operated by the centrifugal force in which the active volume of the compressor chamber is varied in accordance with the load of the motor. So far as the individual parts of Fig. 4 correspond to those of Fig. 2 the same numerals of reference are employed. The compressor chamber 64 is provided with openings 65, 66, 67, 68 which are opened or closed by a cylindrical slide valve 69 in accordance with the speed of the compressor. The slide valve 69 is adjusted by a lever 71 pivotally mounted as indicated at 70. The movement of this lever is effected under the action of the centrifugal force with the aid of a weight 72 rigidly secured thereto. The slide valve 69 is held in the position shown by the pressure spring 73 when the apparatus is at rest. When the compressor is at rest and at low speeds, the compressor chamber 64 is connected to the suction side of the compressor through the openings 65—68 and the corresponding openings 75 to 78 arranged opposite thereto. With increasing speed, the slide valve 69 moves towards the crank shaft and closes upon exceeding a certain speed the openings 68 and 78 so that about one fourth of the total compression chamber becomes effective. Upon a further increase in speed also the openings 67 and 77 are then closed so that now about half the compression chamber becomes effective. If the normal speed of rotation of the compressor is attained also the openings 65 and 75 are closed so that the entire compression chamber available is effective. In this manner, a control device is obtained which adapts itself very accurately to the varying operating conditions and causes the motor to be always driven at a uniform load.

Figs. 5 and 6 show a modified control device which controls the supply of the cooling chamber air to the heat exchange chamber 56 of the evaporator. The control device is so designed that the preferred operating positions may be easily recognized. To this end, the control device is labelled "production of ice" and "cabinet cooling". By correspondingly adjusting the slide cover 83 these inscriptions appear in the openings 82 arranged in the front wall of the hood 50. The use of such a control device may be entirely dispensed with and the opening serving for introducing the ice tray may be used as the only opening for the supply of the cooling chamber air to the evaporator. In this case, the cooling chamber is closed with respect to the chamber 56 by the ice tray itself.

I claim as my invention:

1. A compression-refrigerating apparatus comprising a rotary evaporator, a rotary condenser, a rotary casing enclosing a compressor for the refrigerant, said evaporator, condenser and compressor being united to a rotary set provided with an electric motor, the rotary part of said motor being coaxially arranged with respect to and directly connected to said set, a counter-weight associated with said compressor for driving the compressor during rotation of said set, said rotary set having projecting parts at the periphery thereof forming a ventilator for the production of a current of air for cooling the condenser, the compressor and the motor.

2. A compression-refrigerating apparatus having an evaporator, a condenser, and a compressor united to a hermetically-sealed rotary set, a motor coaxially arranged with respect to and connected to said set, a counter-weight arranged in a casing forming a part of said set, a connection between said counter-weight and compressor adapted to drive the compressor during rotation of said set, said set having at the periphery thereof projections forming a ventilator, said condenser forming a guide for guiding the air supplied by the ventilator to the parts to be cooled of said motor.

3. A compression-refrigerating apparatus having an evaporator, a condenser, and a casing enclosing a compressor united to form a rotary set closed against the outside, a counter-weight arranged in said set, a connection between said counter-weight and said compressor adapted to drive the compressor during rotation of the casing enclosing said compressor, means for driving said set, said compressor being designed as a piston compressor, the pressure chamber of the compressor having apertures communicating with the chamber of the casing enclosing the compressor, and a device for closing and opening said apertures in accordance with the centrifugal force in the manner that the apertures are opened upon the speed dropping below a certain value.

4. A compression-refrigerating apparatus having an evaporator, a condenser, and a casing enclosing a compressor united to form a rotary set closed against the outside, a counter-weight arranged in said set, a connection between said counter-weight and said compressor adapted to drive the compressor during rotation of said set, an electric motor having its armature directly connected to said set, said compressor having a pressure chamber whose effective space is adjustable, and means for adjusting said effective space in accordance with the load of said electric motor.

5. A compression refrigerating apparatus having an evaporator, a condenser, and a compressor united to a rotary set closed against the outside, a motor coaxially arranged with respect to and connected to said set, a counter-weight arranged in a casing forming a part of said set, a connection between said counter-weight and compressor adapted to drive the compressor during rotation of said set, said rotary set being designed as a rotor of a ventilator, and a stationary enclosure enclosing the set and said motor, said enclosure being provided with openings for the inlet and outlet of the cooling air supplied by said set, said openings being so arranged as to cause the air inside the stationary enclosure to follow a tortuous path in order to damp the noise.

6. A refrigerating apparatus comprising a cabinet for the reception of the goods to be cooled, an evaporator, a condenser, and a compressor for the refrigerant united to a rotary set closed against the outside, a counter-weight adapted to retain its position in the chamber during rotation of the set, a connection between the counter-weight and the compressor for driving the compressor during rotation of the set, said compressor and said counter-weight being arranged in different coaxial casings forming parts of the rotary set, said casing of the counter-weight being arranged inside the cabinet and communicating on the one side with the evaporator and on the other side with the suction side of the compressor.

7. A compression refrigerating apparatus comprising a rotary evaporator, a rotary condenser, a rotary casing enclosing a compressor for the refrigerant, said evaporator, condenser and compressor being united to a rotary set, an electric motor having its armature coaxially arranged with respect to and directly connected to said set, a counter-weight associated with said compressor for driving the compressor during rotation of said set, a stationary protective hood surrounding the rotary evaporator inside the refrigerator cabinet, said stationary hood having openings for the inlet and outlet of air, and means for controlling the circulation of air in the cabinet by an adjustable opening and closing of said openings.

8. With a cabinet refrigerator having a compressor, a condenser and a flooded evaporator combined to an airtight rotary set and connected to an electric motor whose armature is directly mounted on the shaft of the rotary set, the evaporator portion of said rotary set being arranged directly inside the cabinet of said refrigerator, and in combination, means for varying the air supply from the inside space of the cabinet to the heat absorbing surface of said evaporator in order to thereby control the evaporator temperature.

9. In an electric cabinet refrigerator having a compressor, a condenser and an evaporator combined to an air-tight rotary set, the portion of said revolving set arranged inside the cabinet being designed as a rotor of a ventilator for circulating the air in the cabinet, a hood disposed inside said cabinet so as to surround said portion, said hood having inlet and outlet openings for allowing an air circulation and being designed as a receptacle for at least one ice tray, said openings being so arranged that a portion of the openings is capable of being closed by the tray in order to diminish the quantity of air circulating through said hood.

10. A compression cabinet refrigerator comprising a rotary evaporator, a rotary condenser, a rotary casing enclosing a compressor for the refrigerant, said evaporator, condenser and compressor being united to a rotary set, an electric motor having its armature coaxially arranged with respect to and directly connected to said set, a counterweight associated with said compressor for driving the compressor during rotation of said set, a portion of said set including the evaporator being arranged inside the cabinet and designed as a ventilator for circulating the air in the cabinet, a stationary protective hood surrounding the evaporator inside said cabinet and being provided with openings for the passage of air to the evaporator, an adjustable cover for said openings, and indicating means for indicating the preferred operating positions of said cover.

11. A compression refrigerating apparatus comprising a rotary evaporator, a rotary condenser, a rotary casing enclosing a compressor for the refrigerant, said evaporator, condenser and compressor being united to a rotary set, an electric motor having its armature coaxially arranged with respect to and directly connected to said set, a counterweight associated with said compressor for driving the compressor during rotation of said set, said condenser comprising a tube wound at the periphery of the set, said tube being directly exposed to the surrounding air and forming a member for the production of a current of air for cooling said compressor and said motor.

12. A compression-refrigerating apparatus comprising an evaporator, a condenser, and a casing enclosing a compressor united to form an hermetically-sealed rotary set, a counter-weight arranged in said set, a connection between said counter-weight and said compressor designed to operate the compressor during the rotation of said compressor casing, an electric motor having its armature directly connected with said compressor casing, a stationary casing surrounding said rotary compressor casing, said condenser and said motor, and having openings for the passage of cooling air, and means for supplying said cooling air, said means forming part of said rotary set.

13. With a cabinet refrigerator having a rotary refrigerating unit comprising a compressor, a condenser and an evaporator, the combination of a stationary protective casing arranged within the cabinet so as to surround the rotary evaporator of said unit and to render said evaporator inaccessible also when the cabinet door is opened, said casing being designed to form a support for detachable ice trays and having openings for the insertion of said trays into the interior space of said casing containing said evaporator.

14. With a compression-refrigerator having a sealed rotary refrigerating set comprising an evaporator compartment, a compartment containing the compressor, and an intermediate coaxial section of smaller diameter connecting said two compartments, in combination an electric motor arranged coaxially with respect to said rotary set and having its armature firmly connected with said compressor compartment, and a stationary casing associated with said motor and commonly enclosing said motor and said rotary compressor compartment.

15. With a cocpression-refrigerator having a sealed rotary refrigerating set comprising an evaporator compartment, a compartment containing the compressor, an intermediate coaxial section of smaller diameter connecting said two compartments, said intermediate section forming a journal, and a stationary support having a bearing engaging said journal, in combination an electric motor arranged coaxially with respect to said rotary set and having its armature firmly connected with said compressor compartment, and a stationary casing associated with said motor and commonly enclosing said motor and said rotary compressor compartment, said stationary casing having a radial wall between said evaporator compartment and said compressor compartment and being connected with said bearing.

16. With a compression-refrigerator having a sealed rotary refrigerating set comprising an evaporator compartment, a compartment containing the compressor, and an intermediate coaxial section of smaller diameter connecting said two compartments, said intermediate section forming a journal, in combination an electric motor arranged coaxially with respect to said rotary set and having its shaft firmly connected with said compressor compartment, a stationary bearing engaging said journal, a second stationary bearing engaging said shaft at the opposite side of said motor with respect to said compressor compartment, a stationary outer casing extending between said two bearings and enclosing said motor and said rotary compressor compartment, a stationary support, and resilient means disposed between said support and said bearings.

17. A compression-refrigerating apparatus having a rotary and hermetically-sealed set comprising an evaporator, a condenser, a compressor, a counter-weight, and a connection between said counter-weight and said compressor adapted to drive said compressor during rotation of said casing, in combination with an electric motor coaxially arranged with respect to the rotation axis of said set and connected with said set, said motor and said counter-weight being so designed in proportion to each other that the maximum torque of said motor is smaller than the maximum counter-moment of said counter-weight, whereby said counter-weight in case of said motor being overloaded causes a braking of said motor and a diminishing of its rotation speed.

18. A compression-refrigerating apparatus having a rotary and hermetically-sealed set comprising an evaporator, a condenser, a compressor, a counter-weight, and a connection between said counter-weight and said compressor adapted to drive said compressor during rotation of said casing, in combination with an electric motor coaxially arranged with respect to the rotation axis of said set and connected with said set, said motor having its maximum torque smaller than the maximum counter-moment of said counter-weight so as to effect in response to overloads a speed-decreasing braking of said motor, and means for diminishing the motor load in response to a decrease of the speed below a given value.

19. In combination with a refrigerator cabinet, a compression-refrigerating apparatus having an evaporator, a condenser, and an enclosure containing a compressor united to an hermetically-sealed rotary set, driving means for rotating said set, a counter-weight operatively connected with said compressor for operating the latter when said set is rotating, a casing enclosing said counter-weight, said casing and said weight being arranged between said evaporator and said compressor, said casing communicating with said evaporator and the suction side of said compressor, the portion of said set including said evaporator and said casing being arranged in said cabinet so as to be exposed to the air inside said cabinet and being designed as the rotor of a blower for circulating the air in said cabinet.

20. In a cabinet refrigerator having a motor-driven rotary refrigerating unit containing within a sealed enclosure an evaporator, a condenser, a compressor and a counterweight mounted rotatably about the rotation axis of said unit and designed to operate said compressor during the rotation of said unit, said enclosure forming at least two compartments of larger diameter and a connecting hollow section of smaller diameter, said section being disposed coaxially between said two compartments and forming a journal, a bearing for supporting said unit, said bearing engaging said journal, said compressor and said weight being arranged on axially different sides of said bearing within said two separate compartments, and means passing said hollow section for operatively connecting said compressor and said weight.

21. With a refrigerator cabinet having a motor-driven rotary set comprising an evaporator, a condenser, a compressor and a pendulous weight for driving said compressor during the rotation of said casing, the combination of an hermetically-sealed casing forming the enclosure of said rotary set, said casing having at least two sections of larger diameter for separately enclosing said compressor and said weight and an intermediate section of smaller diameter disposed axially between said two larger sections, and a stationary bearing for supporting said rotary set, said bearing engaging said intermediate section and being arranged at a heat-insulating outer wall of said cabinet, both said counter-weight and said evaporator being arranged inside said cabinet and separated from the other externally-arranged portion of said rotary set including said compressor and said condenser by said heat insulating outer cabinet wall.

22. With a refrigerator cabinet having a sealed rotary set comprising an evaporator, a condenser, a compressor, and a pendulous counter-weight for operating said compressor, in combination an electric motor coaxially arranged to said set and forming therewith a unit capable of being removed as a whole from said cabinet, a detachable heat insulating insert forming a section of the side wall of said cabinet, said unit being mounted to said detachable insert so as to have said evaporator located at the inner side and said motor and said compressor at the outer side of said insert.

23. A refrigerator having a rotary, hermetically-sealed refrigerating set comprising an evaporator, a compressor, a condenser, a pendulous counter-weight operatively connected with said compressor, and an electric motor coaxially arranged with respect to said rotary set and connected therewith so as to form a unit, in combination with a refrigerator cabinet having its heat insulating walls designed to form a corner projecting into the cabinet chamber near the top of said chamber so as to form a horizontal ledge surface outside of said cabinet and having a detachable vertical wall portion bordering said ledge, said ledge forming a support for said unit, and said detachable wall portion being designed to allow said unit to be as a whole inserted into or removed from said cabinet.

RUDOLF HINTZE.